United States Patent [19]

Sbragia

[11] 3,897,564

[45] July 29, 1975

[54] DIHYDROXYANTHRAQUINONE FUNGICIDES

[75] Inventor: Ronald J. Sbragia, Clayton, Calif.

[73] Assignee: The Dow Chemical Company, Midland, Mich.

[22] Filed: Aug. 6, 1973

[21] Appl. No.: 385,761

[52] U.S. Cl. ................................................ 424/331
[51] Int. Cl. ............................................. A01n 9/24
[58] Field of Search ...................................... 424/331

[56] References Cited
UNITED STATES PATENTS
3,082,075  3/1963  Hemwall ................................. 71/27
FOREIGN PATENTS OR APPLICATIONS
2,060,750  6/1971  Germany

OTHER PUBLICATIONS

Chem. Abst. 61, 3574(a) (1964) – Boymond et al.

Chem. Abst. 70, 105,381(y) (1969) – Arndt.

Chem. Abst. 59, 5712 (a–c) (1963) – Rudman et al.

Primary Examiner—Albert T. Meyers
Assistant Examiner—D. W. Robinson
Attorney, Agent, or Firm—Theodore Post; C. Kenneth Bjork

[57] ABSTRACT

1,4-, 1,8- and 2,5-Dihydroxyanthraquinones are useful for protecting plants from attack by various fungal pathogens when formulated with agricultural additaments.

4 Claims, No Drawings

DIHYDROXYANTHRAQUINONE FUNGICIDES

BACKGROUND OF THE INVENTION

The fungicidal activity of 1,4-, 1,8- and 2,5-dihydroxyanthraquinones was not known for compounds which are homologs, isomers or closely-related analogs thereof.

SUMMARY OF THE INVENTION

It has been discovered that the dihydroxyanthraquinones 1,4-dihydroxyanthraquinone, 1,8-dihydroxyanthraquinone and 2,5-dihydroxyanthraquinone, hereinafter referred to as "compound" or compounds, and mixtures thereof, are particularly adapted to be employed for the control of fungi, especially those fungal organisms ordinarily found on the aerial portions of plants, such as, for example, cherry leaf spot, apple scab, rice blast, powdery mildew, helminthosporium (leaf spot on grasses, cereals, and corn), and late blight. The compounds can also be applied in dormant applications to the woody surfaces of plants or to orchard floor surfaces for the control of the overwintering spores of many such fungi. In addition, the compounds can be applied to seeds to protect the seeds from the attack of fungal organisms such as rot and mildew. Also, the compounds can be distributed in soil at fungicidal concentrations to control the organisms which attack seeds and plant roots, particularly the fungal organisms of root rot and mildew.

In further operations, the compounds can be included in inks, adhesives, soaps, cutting oils, polymeric materials, or in oil or latex paints, to prevent mold, mildew, and the degradation of such products resulting from microbial attack. Also, the compounds can be distributed in textile or cellulosic materials, or can be employed in the impregnation of wood and lumber to preserve and protect such products from the attack of the microbial agents of rot, mold, mildew and decay. The foregoing environments are merely illustrative of the many habitats in which these compounds can be distributed to obtain excellent fungal control.

It is an advantage of the present invention that compositions containing these compounds can be applied to growing vegetation in amounts required for effective control without significant injury to the plants. It is a further advantage that the compounds of the present invention are of very low toxicity to mammals. It is another advantage that a single application of the compounds will provide a residual and extended control of fungi over a period of several months. Also, it is an advantage that the compounds are effective in eliminating established fungal infestation as well as in providing residual and extended control against fungal attack. Further, the compounds have been found to be translocated in plants and thus it is an advantage of the present inventions that the compounds provide a systemic protection against the plant attacking organisms. It is a yet further advantage that the compounds can be handled with a minimum of danger from accidental mammalian exposure thereto because of their low mammalien toxicity.

The method of the present invention comprises contacting a fungal organism with a fungicidal amount of one or more of the compounds. However, the present invention also embraces the employment of a liquid, powder or dust composition containing one or more of the compounds. Such compositions are adapted to be applied to the living plants without substantial injury to the plants. In preparing toxicant compositions, the compounds can be modified with one or more of a plurality of additaments including organic solvents, petroleum distillates, water or other liquid carriers, surface active dispersing agents, and finely divided inert solids, frequently referred to as "adjuvants" or "agricultural adjuvants". In such compositions, the compounds oftentimes are present in a concentration from about 2 to 98 percent by weight. Depending upon the concentration in the composition of the compound, such augmented compositions are adapted to be employed for the control of the undesirable fungi or employed as concentrates and subsequently diluted with additional inert carrier to produce the ultimate treating compositions. In compositions where the adjuvant or helper is a finely divided solid, a surface-active agent, or the combination of a surface-active agent and a liquid additament, the carrier cooperates with the active compound so as to facilitate the invention, and to obtain an improved and outstanding result.

The exact concentration of the compound employed in the compositions for application to the fungal organism and/or its habitat can vary, provided a fungicidal dosage of toxicant is applied either on the organism or its environment. This dosage of toxicant is primarily dependent upon the susceptibility of the particular organism to the particular compound employed. In general, good results are obtained with liquid and especially aqueous compositions or dispersions containing from about 0.01 to 2.0 percent by weight of toxicant. With dusts, good results are usually obtained with compositions containing from 0.01 to 2.0 percent or more by weight of toxicant. Where the compositions are to be applied to living plants, it is preferred that the toxicant be present in an amount not to exceed about 0.8 percent in liquid compositions and 1.0 percent in dusts. In some operations with liquid and dust compositions, concentrations of from 2 to 98 percent by weight of compounds are advantageously employed, for example in applications to orchard floor surfaces for the control of spores. In terms of acreage application, good controls of fungal organisms are obtained when the compounds are applied to plots of growing plants at a dosage of from 0.004 to 3 or more pounds per acre.

In the protection and preservation of inks, adhesives, cutting oils, paints, textiles and paper, good results are obtained when the compounds are incorporated in such products in the amount of at least 0.01 percent by weight. In the preservation of wood, excellent results are obtained when the compounds are incorporated by conventional treatment in the wood in the amount of at least 0.0001 pound per cubic foot of wood.

In the preparation of dust compositions, the toxicant products can be compounded with any of the finely divided solids such as pyrophyllite, talc, chalk, gypsum, and the like. In such operations, the finely divided carrier is ground or mixed with the toxicant or wet with a solution of the toxicant in a volatile organic solvent. Similarly, dust compositions containing the compounds can be compounded with various solid surface-active dispersing agents, such as fuller's earth, bentonite, attapulgite and other clays. Depending upon the proportions of ingredients, these dust compositions can be employed for the control of fungi or employed as concentrates and subsequently diluted with an additional solid surface-active dispersing agent or with pyrophyllite, chalk, talc, gypsum and the like to obtain the desired amount of active ingredient in a composition adapted to be employed for the control of fungi. Also, such dust compositions, when employed as concentrates, can be dispersed in water, with or without the aid of dispersing agents, to form spray mixtures.

Further, the compounds or liquid or dust concentrate compositions containing such compounds can be incorporated in intimate mixture with surface-active dispersing agents such as non-ionic emulsifying agents to form spray compositions. Such compositions are readily employed for the control of fungi or are dispersed in liquid carriers to form diluted sprays containing the toxicants in any desired amount. The choice of dispersing agents and amounts thereof employed are determined by the ability of the agents to facilitate the dispersion of the concentrate in the liquid carrier to produce the desired spray compositions.

Similarly, the toxicant products can be compounded with a suitable water-immiscible organic liquid and a surface-active dispersing agent to produce emulsifiable concentrates which can be further diluted with water and oil to form spray mixtures in the form of oil-in-water emulsions. In such compositions, the carrier comprises an aqueous emulsion, i.e., a mixture of water-immiscible solvent, emulsifying agent and water. Preferred dispersing agents which can be employed in these compositions are oil-soluble and include the non-ionic emulsifiers such as the condensation products of alkylene oxides with the inorganic acids, polyoxyethylene derivatives of sorbitan esters, complex ether alcohols and the like. Suitable organic liquids which can be employed in the composition include petroleum oils and distillates, toluene, and synthetic organic oils. The surface-active dispersing agents are usually employed in liquid compositions in the amount of from 0.1 to 20 percent by weight of the combined weight of the dispersing agent and active compound.

When operating in accordance with the present invention, one or more of the compounds or a composition containing one or more of the compounds can be applied to the fungal organisms to be controlled, or to their habitats in any convenient fashion, e.g., by means of hand dusters or sprayers. Applications to the above-ground portions of plants conveniently can be carried out with powder dusters, boom sprayers, high-pressure sprayers, and spray dusters. In foliar applications, the employed compositions should not contain any appreciable amount of phytotoxic diluents. In large scale operations, dusts or low volume sprays can be applied from airplanes.

In other operations, one or more of the compounds can be dispersed in an atmosphere, particularly within a space temporarily or permanently enclosed, such as a greenhouse, railroad car, or the like, to control fungal organisms therewithin, to protect contents exposed to the atmosphere, and to control air-borne fungal organisms, such as spores and the like. In these operations, one or more of the compounds can be placed upon a surface of which the temperature facilitates volatilization, at a desired rate, of the compounds or composition containing the same into the atmosphere. Also, in an alternate embodiment, one or more compounds can be used in an aerosol composition or in combination with a cosolvent, and the resulting composition released from a pressure container into the atmosphere.

The following examples further illustrate the present invention.

EXAMPLE 1

The compounds are separately dissolved in acetone and diluted with water containing 0.05% Tween 20 wetting agent to give 4,000 p.p.m. concentration treating solutions. The solutions are individually sprayed onto the primary leaves of cranberry bean seedlings. When the plants are dry, they are inoculated with an aqueous suspension of powdery mildew (*Erysiphe polygoni*) conidia. One week later, the untreated checks are uniformly heavily infected with mildew while the treated plants show the following results:

| Treatment | % Disease Control at 4000 ppm |
|---|---|
| 1,4-dihydroxyanthraquinone | 100 |
| 1,8-dihydroxyanthraquinone | 100* |
| untreated checks | 0 |

*some initial phytotoxicity symptoms present on plants eventually disappear as the plants continue to grow.

EXAMPLE 2

The compound is separately dissolved in acetone and diluted with water containing 0.002% Tween 20 wetting agent to give a treating solution. The solution is drenched into pots containing cranberry bean seeds at a rate equivalent to 10 lbs. of compound/surface acre. After one week, the beans emerge and the primary leaves are inoculated with an aqueous suspension of powdery mildew conidia. One week after inoculation, the untreated checks are uniformly heavily infected with mildew while the treated plants show the following results:

| Treatment | % Disease Control at 10 lbs./acre |
|---|---|
| 2,5-dihydroxyanthraquinone | 90 |
| untreated checks | 0 |

EXAMPLE 3

A 1000 p.p.m. acetone concentrate is prepared for each compound and 1 ml. of concentrate of each is added to 9 ml. of 20% isopropanol in water to give 100 p.p.m. solutions of each. The solutions are individually sprayed onto the primary leaves of cranberry beans which have been inoculated with powdery mildew 3 days earlier. Benlate fungicide is included in the test as a comparison standard. For this compound, the 1,000 p.p.m. concentrate is prepared in water using a 50% wettable powder formulation. The test is graded with the following results:

| Treatment | % Disease Control at 100 ppm |
|---|---|
| 1,4-dihydroxyanthraquinone | 100 |
| 1,8-dihydroxyanthraquinone | 99 |
| Benlate | 90 |

EXAMPLE 4

A test is run identical to that of Example 3, except that after preparing the 100 p.p.m. concentrates, three fourfold serial dilutions are prepared to give a 100, 25, 6.2 and 1.5 p.p.m. dilution series for each compound. The following results are obtained:

| Treatment | % Disease Control at Indicated Dosage, ppm | | | |
|---|---|---|---|---|
| | 100 | 25 | 6.2 | 1.5 |
| 1,4-dihydroxyanthraquinone | 100 | 99 | 99 | 25 |
| 1,8-dihydroxyanthraquinone | 99 | 99 | 97 | 95 |
| Benlate | 93 | 93 | 90 | 90 |

EXAMPLE 5

A 1000 p.p.m. acetone concentrate was prepared for each compound and for Benlate 50% wettable powder in water. One ml. of each concentrate was added to 9 ml. of 20% isopropanol in water to give a 100 p.p.m. solution of each compound from which three fourfold serial dilutions were prepared to give a 100, 25, 6.2 and 1.5 p.p.m. dilution series for each. The solutions were sprayed onto the primary leaves of cranberry bean seedlings and the plants were inoculated with mildew when dry. The following results were obtained.

| Treatment | % Desease Control at Indicated Dosage, ppm | | | |
|---|---|---|---|---|
| | 100 | 25 | 6.2 | 1.5 |
| 1,4-dihydroxyanthraquinone | 100 | 67 | 0 | 0 |
| 1,8-dihydroxyanthraquinone | 97 | 95 | 15 | 0 |
| Benlate | 100 | 99 | 90 | 25 |

What is claimed is:
1. A method which comprises contacting a fungal organism with a fungicidal amount of a dihydroxyanthraquinone of the group consisting of 1,4-, 1,8- and 2,5-dihydroxyanthraquinone.
2. The method of claim 1 wherein the dihydroxyanthraquinone is 1,4-dihydroxyanthraquinone.
3. The method of claim 1 wherein the dihydroxyanthraquinone is 1,8-dihydroxyanthraquinone.
4. The method of claim 1 wherein the dihydroxyanthraquinone is 2,5-dihydroxyantraquinone.

* * * * *